UNITED STATES PATENT OFFICE.

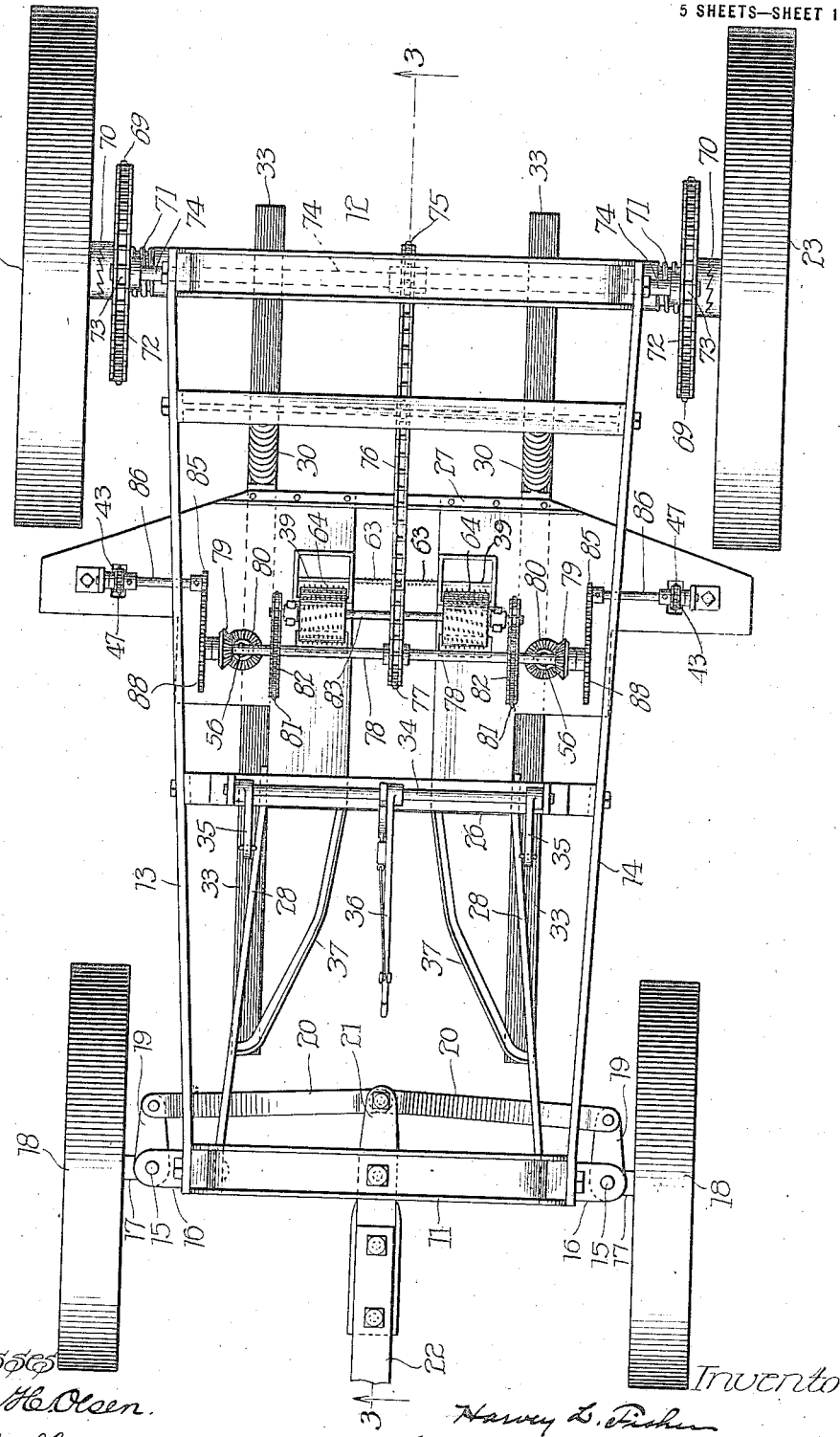

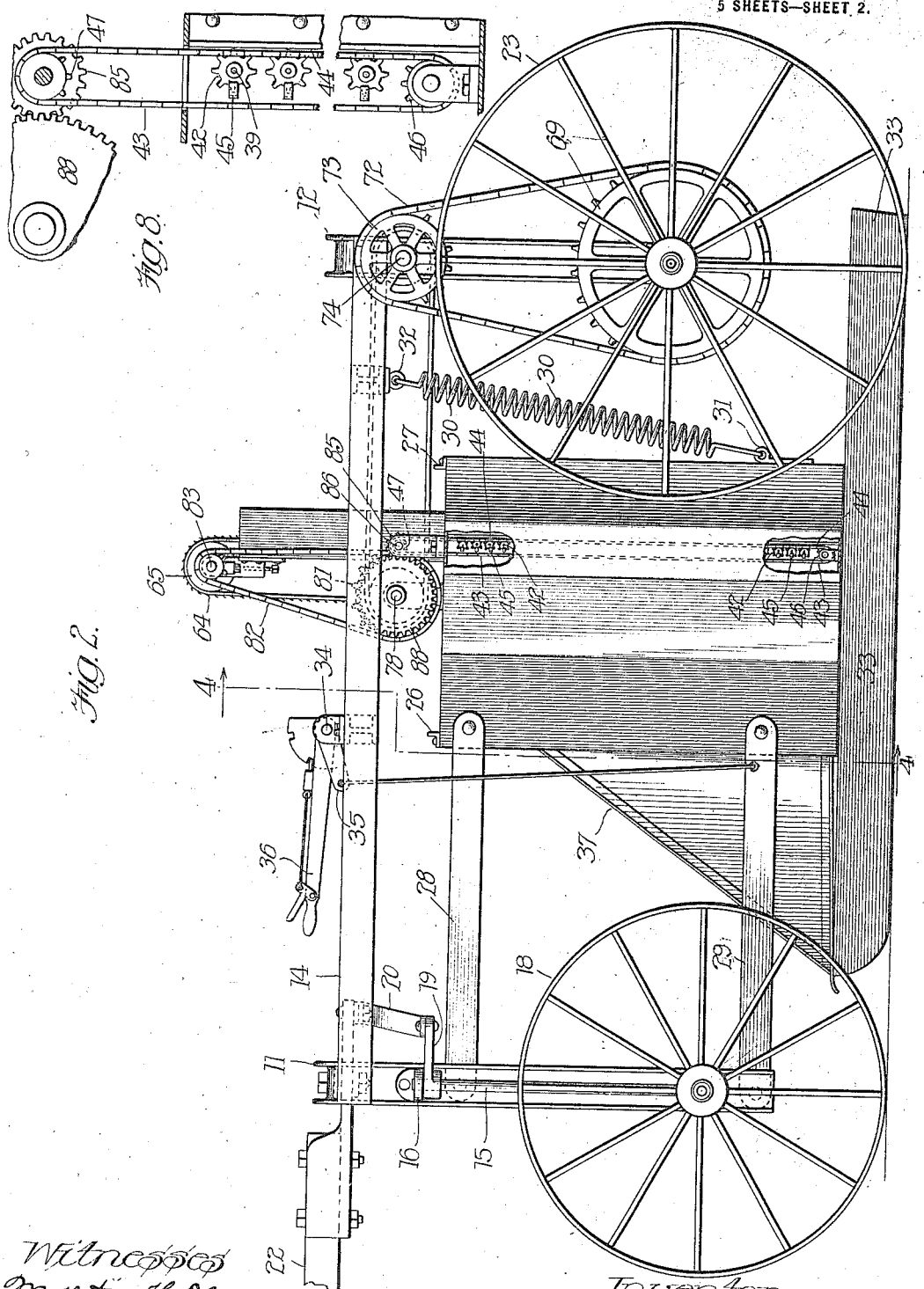

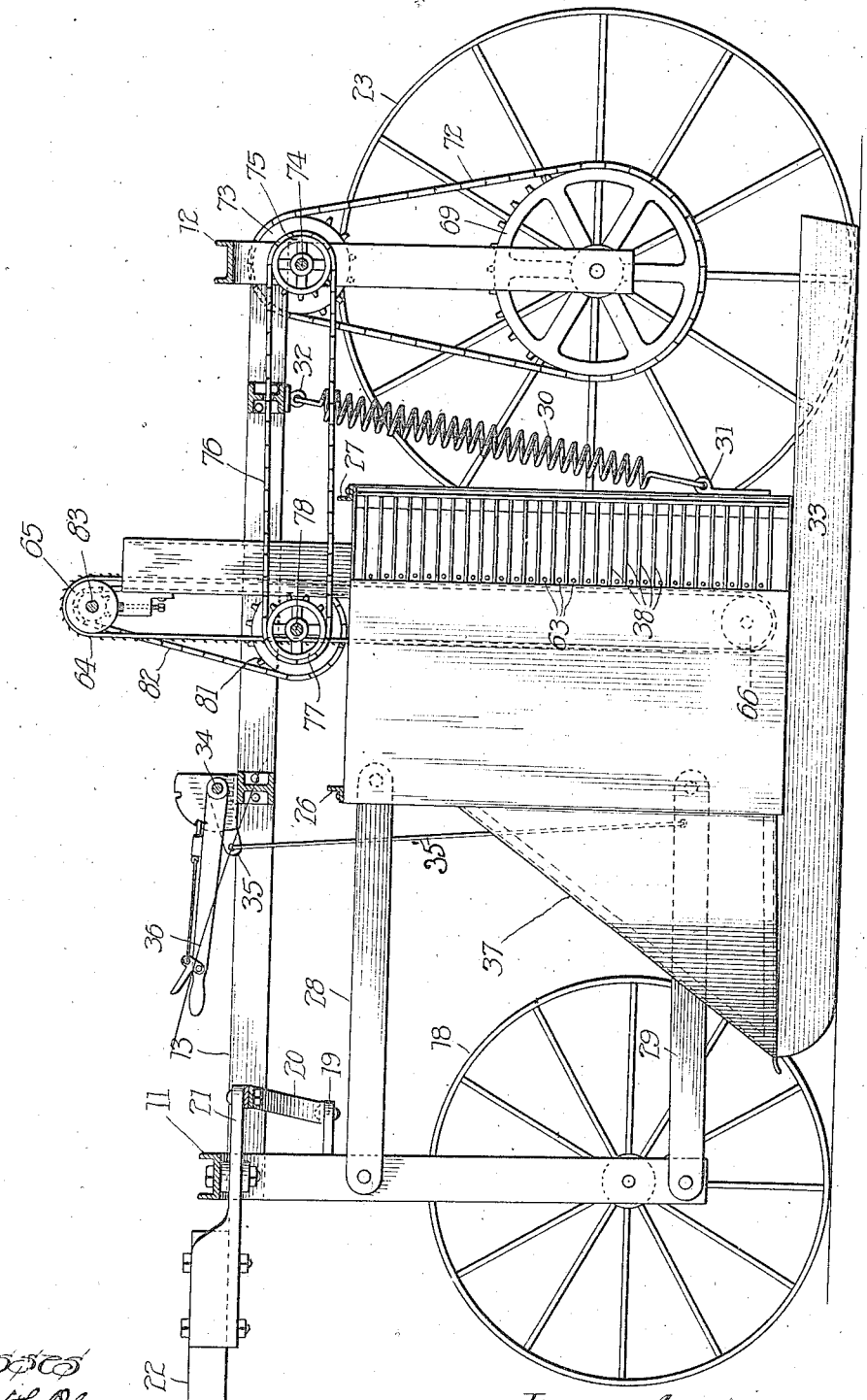

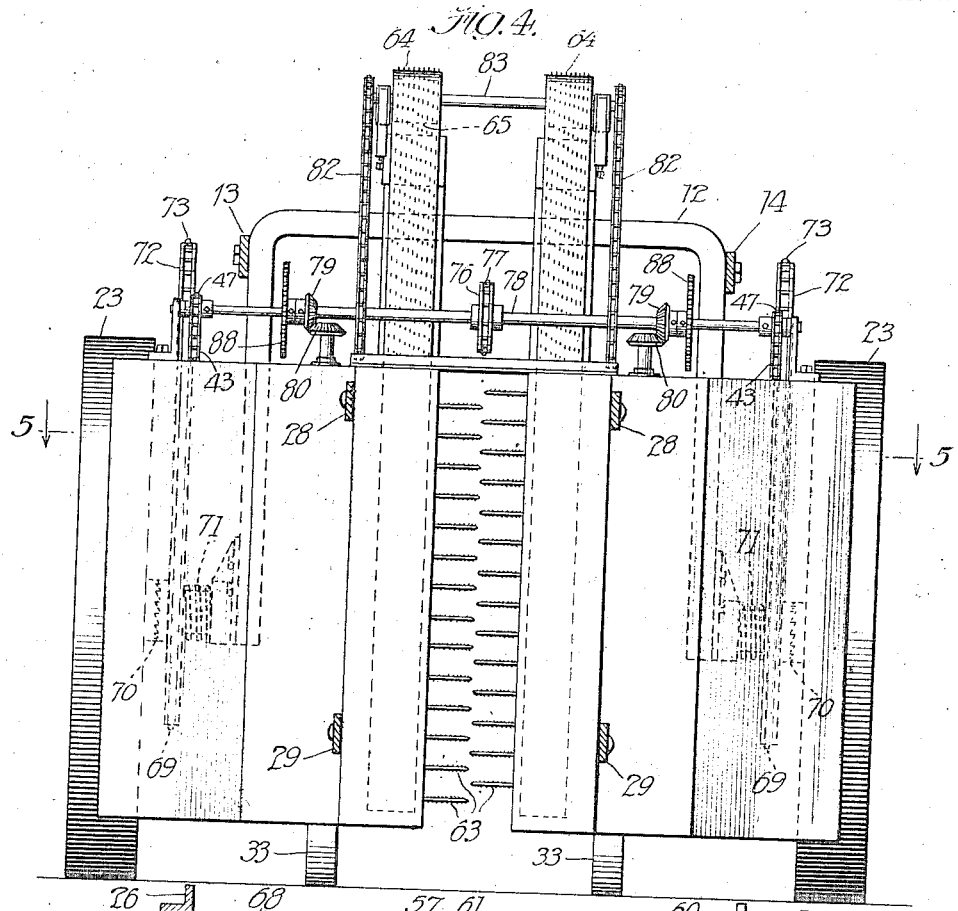

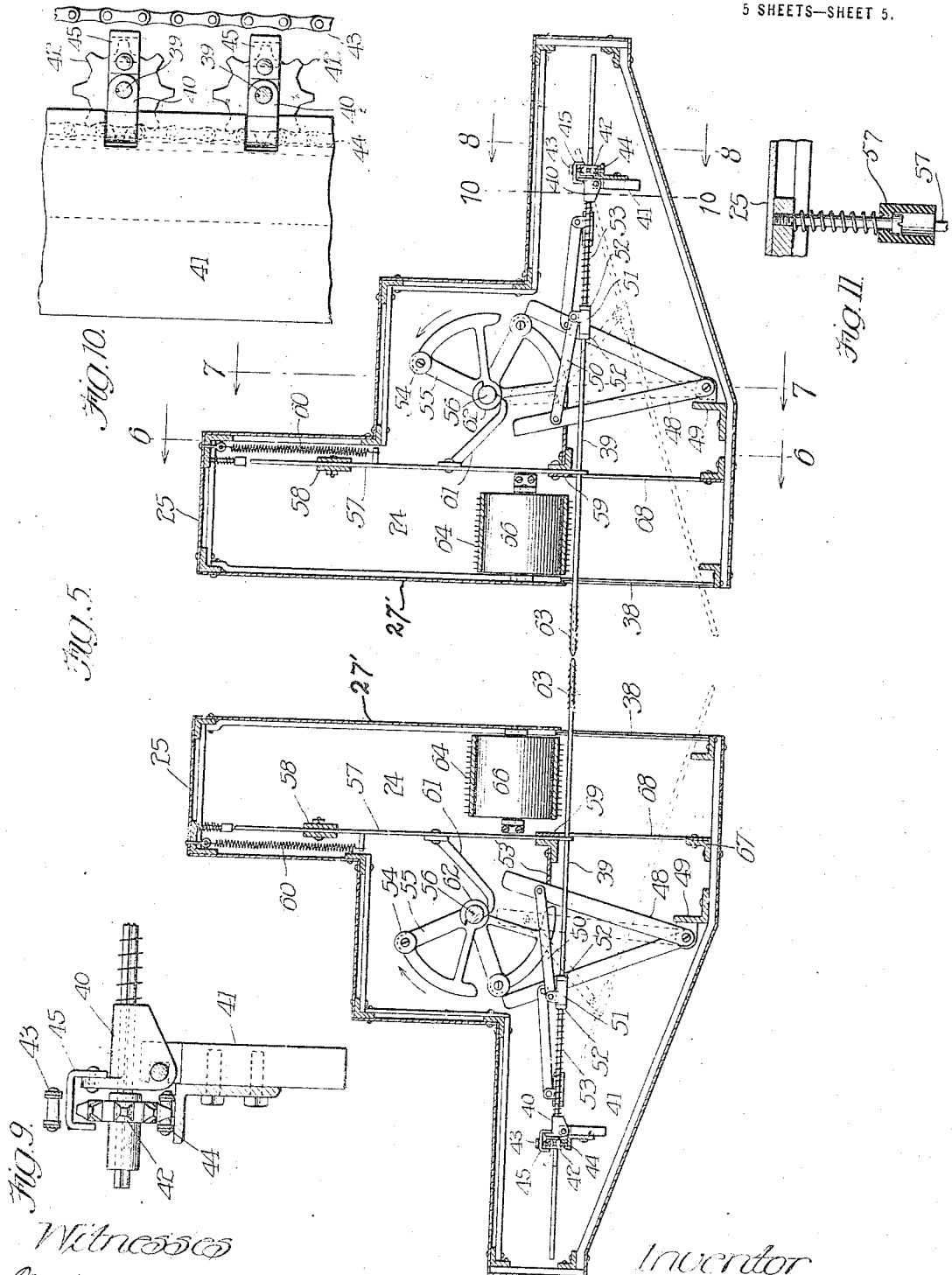

HARVEY L. FISHER, OF CHICAGO, ILLINOIS, ASSIGNOR TO DONALDSON & FISHER COMPANY, OF CHICAGO, ILLINOIS, A CORPORATION OF ARIZONA.

COTTON-PICKING MACHINE.

1,229,598.  Specification of Letters Patent.  Patented June 12, 1917.

Application filed August 22, 1912. Serial No. 716,384.

*To all whom it may concern:*

Be it known that I, HARVEY L. FISHER, a citizen of the United States, residing at Chicago, in the county of Cook and State of Illinois, have invented certain new and useful Improvements in Cotton-Picking Machines, of which the following is a specification.

The object of my invention is a cotton picking machine which will rapidly and thoroughly pick all the ripe cotton on the plants to which it is applied, without breaking or injuring them or the unopened bolls of immature cotton, which may be operated by those unskilled in mechanics and with a minimum of attention on the part of the operator, and which is sufficiently light, easy running and strong for the purpose, and may be built at a moderate cost. One of the main facts about the cotton plant which makes the problem a difficult one, is that the bolls do not all ripen together but mature at different periods, requiring a number of pickings of the same plant. It is therefore necessary that in the earlier pickings the plants and immature bolls be uninjured or the value of the crop is materially diminished. With this in view my machine consists in a truck or vehicle adapted to span a single row of plants without injuring the neighboring rows and to be drawn along over the row carrying a pair of picker mechanisms, arranged on opposite sides of the machine and between which is a passage or channel through which the plants pass as the machine is drawn forward. Into this passage are thrust at short intervals of time the picker spindles or fingers of two vertical series arranged respectively upon opposite sides of the passage, each spindle being rotated rapidly in contact with the plant or with the cotton thereon. After a brief period of rotation in the projected position, during which if it comes in contact with a cotton boll it winds up the cotton, the spindle is withdrawn into contact with a device which removes the cotton therefrom and carries it to a suitable point for storage. Obviously if the picker comes in contact with no cotton it is retracted empty. The pickers are also so mounted as to give way under pressure of the plants as the machine is drawn forward to avoid injuring the same. The construction by which these results are accomplished will be understood by a reference to the accompanying drawings forming a part of the application and the following detailed description, it being understood, however, that the description of a specific mechanism, though it constitutes a suitable and preferred means for carrying out my invention, is for the purpose of exemplification only and my invention is not limited thereto, but its scope is pointed out in the following claims.

Referring now to the drawings, Figure 1 is a plan of a specific form of my cotton picker showing the essential features thereof; Fig. 2 is a side elevation, partly broken away, to show parts which would otherwise be concealed; Fig. 3 is a longitudinal vertical section upon the line 3—3 of Fig. 1 looking in the direction of the arrows; Fig. 4 is a vertical transverse section upon the line 4—4 of Fig. 2 looking in the direction of the arrows; Fig. 5 is a horizontal cross section of a detail of my mechanism upon the line 5—5 of Fig. 4; Fig. 6 is a vertical section upon the line 6—6 of Fig. 5 looking in the direction of the arrows, the construction being shown as partly broken away in order to condense the view; Fig. 7 is a vertical section upon the line 7—7 of Fig. 5, the lower portion of the construction being omitted; Fig. 8 is a vertical section upon a somewhat enlarged scale upon the line 8—8 of Fig. 5, the structure being shown as broken away in the middle for the purpose of condensing the view and other portions being shown fragmentarily for the same purpose; Fig. 9 is a section of a detail on the plane of Fig. 5 but on an enlarged scale and Fig. 10 is a fragmentary vertical section of a detail upon the line 10—10 of Fig. 5; Fig. 11 is a sectional detail to be described later.

In the following description I have used the same character to refer to a part wherever it occurs in the several views.

As heretofore stated, my cotton picking machine comprises a truck adapted to span a row of plants to be picked and a pair of picker mechanisms on opposite sides of the plants. The machine for operating upon the plants. The truck in its principal features and the manner of mounting the picker mechanism thereon are disclosed and claimed in an application No. 703919 filed by me June 15, 1912, and therefore need only be briefly referred to in the present specification. The truck comprises front and rear arches 11, 12 formed of suitable U-bars and connected near their tops by longitudinal members 13, 14. The front wheels of the vehicle are indirectly mounted upon the legs or side members of the arch 11 by means of vertical shafts 15, 15 which are journaled in brackets 16, 16 secured to the arches and provided near their lower ends with outwardly extending arbors or stub shafts 17, 17 upon which the front wheels 18, 18 are mounted. At their upper ends the shafts carry rearwardly extending arms 19, 19 which are connected by links 20, 20 to a rearward extension 21 of the vehicle tongue 22, so that the wheels are turned to follow the direction of movement of the draft animals by which the vehicle may be drawn. The rear wheels 23, 23 are mounted upon stationary stub-shafts projecting from the lower ends or legs of the rear arch 12 and not only assist in supporting the machine but by intermediate mechanism to be described later, form the driving means for the picker mechanism. The latter consists in two distinct units 24, 24 comprising casings 25, 25 connected together by front and rear cross braces 26, 27 and spaced apart a suitable distance to permit the plants to be treated to pass between their adjacent walls 27', 27'. The casings and their contained mechanism are supported from the vehicle by horizontal links 28, 29 by which they are connected at top and bottom respectively, and upon opposite sides to the legs of the front arch, the arrangement and connection being such that the picker mechanisms have a capacity for oscillation substantially in a vertical plane, and by reason of the flexibility of the links the picker mechanism is free to accommodate itself laterally of the machine to irregularities in the row of cotton plants and minor deviations on the part of the carriage. The main, or a substantial portion, of the weight of the picker mechanism is supported by a pair of springs 30, 30 connected at one end to the rear walls of the picker casings as at 31 and at their upper ends to the longitudinal members of the vehicle frame as at 32. Though the main portion of the weight of the picker mechanism is supported as stated, it is partly borne and its distance from the ground is maintained by a pair of parallel longitudinal skids or runners 33, 33 each of which extends beneath one of the picker casings. Thus, though the main burden is borne upon the wheels of the vehicle, the vertical relation of the picker mechanism to the plants operated upon is maintained by the skids which are so shaped as to easily ride over any minor obstructions which they may encounter. When, however, the mechanism is to be transported without operating upon plants, as for example in going to and from the cotton field, the picker mechanism may be raised by means of a rock shaft 34 having arms 35 connected to the lower links by rods 35', 35', and a handle 36 which may be adjusted to hold the picker mechanism at the desired elevation. A pair of flared triangular wings 37, 37 extend from the front ends of the skids to the adjacent walls of the picker casings, of which, in effect, they form extensions, in order to guide and gather the plants within the passage between the picker casings.

The picker mechanisms upon opposite sides of the machine are counterparts of each other and the description of one will therefore be sufficient, it being understood that it applies equally to the other mechanism.

The adjacent or inner walls of the casing are horizontally slotted as at 38 the slots being arranged in vertical series for the reception of a corresponding series of picker fingers (see Figs. 3 and 5). The latter are arranged so closely together that when projected it will be impossible for a boll of cotton to pass between adjacent members of the series without being engaged by one of them and having its cotton entangled and removed. Each picker finger 39 extends at its rear end through a pivoted bearing block 40 which forms a support at this point for the picker finger but by reason of its pivotal connection with the upright 41 permits the finger to swing horizontally in its slot 38. Adjacent its block 40 each picker finger carries a sprocket 42 which is loosely splined thereon, the series of sprockets being maintained in proper vertical relation by their engagement with the links of sprocket chain 43. Notwithstanding that the fingers are free to swing horizontally they never leave their engagement with the chain, the teeth of the sprocket wheels being sufficiently long to prevent such an occurrence. In order to avoid engagement of the sprocket teeth with the reverse run of the sprocket chain each of the pivoted bearings 40 carries a U-shaped guard 45 which is interposed at the proper point for the purpose between the sprocket and the chain and also prevents endwise movement of the sprocket. The mounting of the chain is shown more particularly in Figs. 2 and 8, reference to which will show it passing around a lower sprocket 46 and an upper sprocket 47 through the latter of which it is driven by mechanism to be hereinafter described. A series of operating arms 48 is pivoted to an angle iron (see Fig. 5) each member of the series being connected by a link 50 with a collar 51 through which a corresponding picker finger extends and in which it is revoluble. Upon opposite sides of the collar 51 each picker finger is provided with collars 52, 52 to prevent longitudinal motion with relation thereto, and between one of said collars and the pivoted bracket 40 is compressed a spring 53 which normally tends to force the picker finger into its projected position. The outward movement of the picker fingers, however, is limited by a stop 53 with which the arms 48 come in contact and the latter are thrown into their rearward position and the picker fingers retracted by a series of rollers 54 mounted upon the sectors 55 carried by a vertical shaft 56. The rotation of the shaft 56 being in the direction of the arrows shown in Fig. 5, each cam roller will engage its arm and retract the same and it will be held in a retracted position until the corresponding sector has freed the end of the arm which thereupon, together with its picker finger, snaps forward under the influence of its spring 50. Each picker finger is also engaged near its end by an eye bar 57 which is longitudinally and horizontally movable in stationary guides 58, 59 in the casing and is normally retracted by the spring 60 to bring an arm 61 projecting from said eye bar into contact with a cam 62 formed upon the collar of a sector 55. The rear ends of the eye bars 57 are cushioned if desired by spring-pressed rubber stops 57' upon which their rear ends are adapted to impinge. It will thus be seen that the picker fingers 39 will yield and swing backward if their forward progress is resisted as by coming in contact with the stock of a cotton plant, until retracted within the casing, but during normal operation and unless retracted they will have a slight oscillation in a horizontal plane for each rotation of the shaft 56. The purpose of this oscillation will presently appear.

In order to remove the cotton or lint collected by the picker fingers which, as shown, in Fig. 5 are provided with barbs 63 at their outer ends for this purpose, I arrange adjacent the position which the heads of the pickers occupy when retracted, a vertical endless belt 64 provided with card clothing or other suitable means for engaging the cotton. The belt is mounted upon upper and lower pulleys 65, 66, the upper of which is driven by mechanism to be presently described, and the lower runs idly. As shown in Fig. 5 the picker fingers are held slightly away from the card clothing belt while in their projected position, this being due to the engagement of the cam 62 on shaft 56 by the arm 61. When, however, a picker finger is retracted to bring its head opposite said belt, the construction of the cam 62 is such as to permit the picker finger to be brought close to the surface of the card clothing, which thereupon removes the cotton lint from the picker head and carries it away to any suitable storage receptacle which may be arranged in the path of the belt. Obviously, if desired a doffer, such as is common in cotton machinery, may be provided for stripping the cotton from the belt. In operation each picker finger is first projected through the slot 38 into the passage between the casings, then retracted within the casing until the picker head is opposite the belt carrying the card clothing, then drawn in close relationship to the belt of the card clothing until the cotton lint is removed, then swung slightly away from the card clothing and finally again projected. Preferably the belt is made to travel in such a direction as to tend to unwind the cotton which has been wound up upon the picker head to facilitate the ready removal of the cotton. Between the guide 59 and an L-bar 67 upon the wall of the casing extends a grid 68 the bars of which are horizontal and constitute additional guides for the picker fingers.

I have shown in the accompanying drawings a suitable means for driving the picker mechanism from the rear wheels of the machine. Upon the arbors of the latter and between the hubs of the same and the lower end of the rear arch 12 I have mounted sprocket wheels 69 upon the hubs of which and of the vehicle wheels are formed interengaging teeth 70 forming clutches, the sprocket wheels having a slight longitudinal movement upon the arbors and being pressed outward by coiled springs 71, 71. Endless chains 72, 72 engage the sprockets 69 and also embrace sprockets 73 upon a transverse shaft 74 journaled in the sides of the rear arch near the top thereof. It will be obvious that the shaft 74 will be forwardly driven whenever either rear wheel moves in a corresponding direction. At its center the shaft 74 carries another sprocket 75 with which one end of a loop of an endless chain 76 engages, the other end of the loop being passed around the sprocket 77 upon a transverse shaft 78 located above the picker mechanisms. The shaft 78 in addition to the sprocket wheel 77 carries a pair of bevel pinions 79, 79, near its opposite ends which mesh with corresponding pinions 80, 80, upon the upper ends of the cam shafts 56 which retract and project the picker fingers. The transverse shaft 78 also carries sprockets 81 which drive chains 82 for turning shaft 83 upon which the belt pulleys are mounted. Upon the outer ends of shaft 78 also are mounted gears 88 engaging gears 85 on countershafts 86 which at their outer ends carry the sprockets upon which the chains for rotating the picker fingers are mounted.

From the foregoing description when taken with the accompanying drawings, the operation of the picker machine may be readily understood. When the latter is drawn along a row of cotton plants the latter enter the passage between the picker mechanisms and ultimately come in contact with the picking fingers which, as above described, are being constantly rotated and rapidly reciprocated through the slots in the casings to form a constantly moving but effectively continuous screen through which the cotton plants pass. While the reciprocations of the fingers are rapid, they are maintained in their projected positions a sufficient length of time to wind up any cotton with which they may come into contact and in their retracted position long enough to permit the card clothing belts to remove the cotton therefrom. In order to distribute the effort of the cam shaft the cams are so arranged that the picker fingers are projected *seriatim* or in groups, though this is not essential. The fingers yield to the relatively rearward movement of the plants as they pass through the central passage thus providing for a longer contact with the plants than they would otherwise have and also avoiding any injury either to the plants or to the picker fingers. Such is the preferred construction and mode of operation of my cotton-picking machine but, as before stated, other forms of the device may be employed or modifications of or additions to the machine described introduced without departing from my invention which I intend to cover in its broadest scope by the following claims. Among other modifications which will suggest themselves at once is that the machine may, by certain obvious changes, be driven by some suitable form of motor, as for example, a gas engine, in which event, of course, the picker mechanism might still be driven from the rear wheels of the vehicle or a more direct drive from the engine might be adopted.

I claim:

1. In a machine for picking cotton plants, a truck or carriage, a frame, picker mechanism mounted thereon and means flexibly connecting said frame to the carriage to permit lateral movement of the former with relation to the latter.

2. In a machine for picking cotton from the plant, a truck or carriage, a frame, picker mechanism mounted on the frame and flexible links connecting the frame to the carriage and permitting lateral and vertical motions relative thereto.

3. In a cotton-picking machine, a truck or carriage, a pair of casings spaced apart laterally of the machine and each carrying a picker mechanism and flexible connections from the casings to the carriage permitting lateral and vertical motion of the former with relation to the latter.

4. In a machine for picking cotton, a truck or carrier, a casing mounted thereon, a substantially vertical series of picker fingers longitudinally movable in the casing transversely of the path of movement of the machine, means for longitudinally reciprocating the fingers with respect to the casing and maintaining the same stationary in retracted position, and movable means arranged adjacent to the retracted position of the fingers adapted to remove and carry away the cotton therefrom.

5. In a cotton picking machine, a casing having a wall extending longitudinally of the machine, provided with a substantially vertical series of openings, picker fingers mounted adjacent said openings, means for projecting and retracting the fingers therethrough and maintaining them stationary in retracted position, the fingers being normally substantially perpendicular to said wall, movable means arranged adjacent the retracted position of the fingers and adapted to remove and carry away cotton therefrom.

6. In a cotton picking machine, a casing having a longitudinal wall provided with a substantially vertical series of openings, picker mechanism mounted adjacent said openings, means for projecting and retracting the fingers therethrough, and maintaining them stationary in retracted position, and a carrier belt provided with card clothing, the surface of which adjacent the fingers is parallel and close to said fingers and adapted to remove cotton therefrom.

7. In a machine for picking cotton, a substantially vertical series of picking fingers, means for axially projecting and retracting the same and maintaining them stationary in a retracted position, a belt provided with cotton-engaging means arranged adjacent to the retracted position of the fingers and adapted to remove and carry away the cotton therefrom.

8. In a cotton picking machine, a casing, a wall of which is provided with a substantially vertical series of openings, picking fingers mounted adjacent said openings for longitudinal reciprocation, means for projecting, retracting and maintaining the fingers stationary in retracted position, a belt provided with cotton-engaging means arranged adjacent the retracted position of the fingers and adapted to remove and carry away the cotton therefrom.

9. In a machine for picking cotton, a substantially vertical series of picking fingers, means for axially projecting and retracting the same and maintaining them stationary in retracted position, a belt provided with cotton-engaging means arranged adjacent the retracted position of the fingers and adapted to remove and carry away the cotton therefrom.

10. In a machine for picking cotton, a series of reciprocable picker fingers, means for longitudinally reciprocating the fingers transversely of the machine into and out of contact with the plants to be picked, and retaining them stationary in retracted position, a movable means adjacent the picker fingers, removing and carrying away cotton therefrom.

11. In a machine for picking cotton, a series of reciprocable cotton picking fingers, means for continuously revolving the fingers, means for longitudinally reciprocating the fingers into and out of contact with the plants to be picked, and retaining them stationary in retracted position and means for stripping cotton from the fingers.

12. In a machine for picking cotton, a series of cotton picking fingers, means for continuously revolving the fingers, means for longitudinally reciprocating the same and holding them against translation intermediate reciprocations thereof, and a belt provided with means for stripping cotton from the fingers in engaging position with respect thereto.

13. In a machine for picking cotton, a series of cotton-picking fingers, means for continuously revolving the fingers, means for axially reciprocating the same and retaining them stationary in retracted position and a belt provided with card clothing means for stripping cotton from the fingers.

14. In a machine for picking cotton, a series of picking fingers adapted to be axially projected transversely of the machine into contact with and retracted from the plants, means for effecting such motion of the fingers and retaining them stationary in retracted position, rotary wheels keyed upon the fingers and means engaging the wheels for rotating the same.

15. In a machine for picking cotton, a vertical series of picker fingers, a series of bearing blocks pivoted on vertical axes in which the picker fingers are respectively journaled and arranged to reciprocate, and means for rotating and reciprocating the fingers.

16. In a machine for picking cotton, a vertical series of picker fingers, a series of pivoted bearing blocks in which the picker fingers are journaled and arranged to reciprocate, means for reciprocating the fingers, and yielding means for normally holding the picker fingers transverse to the path of movement of the machine.

17. In a cotton-picking machine, a series of picker fingers mounted to reciprocate transversely of the machine, a series of bearing blocks pivoted on vertical axes and through which the picker fingers reciprocate and with which they are adapted to swing, means for reciprocating the picker fingers, a rotary wheel mounted upon and adapted to rotate each picker finger and means for rotating the wheels.

18. In a machine for picking cotton, a series of picker fingers reciprocable transversely of the machine, a series of pivoted brackets through which the respective picker fingers reciprocate, a series of sprocket wheels mounted upon the respective picker fingers and adapted to rotate the same and a sprocket chain engaging the sprockets.

19. In a machine for picking cotton, a substantially vertical series of picker fingers, a series of pivoted bearing blocks in the members of which the picker fingers are respectively mounted, sprocket wheels keyed upon the picker fingers adjacent the brackets, a sprocket chain engaging the sprocket wheels and means for reciprocating the picker fingers in the bearing blocks and sprocket wheels.

20. In a machine for picking cotton, a substantially vertical series of picker fingers, a series of pivoted bearing blocks in the members of which the picker fingers are respectively mounted, sprocket wheels keyed upon the picker fingers adjacent the brackets, a sprocket chain engaging the sprocket wheels, guards embracing the periphery of the sprocket wheels, and means for reciprocating the picker fingers in the bearing blocks and sprocket wheels.

21. In a machine for picking cotton, a substantially vertical series of picker fingers, a series of pivoted bearing blocks in the members of which the picker fingers are respectively mounted, sprocket wheels keyed upon the picker fingers adjacent the brackets, a sprocket chain engaging the sprocket wheels, a guide for maintaining the sprocket chain in contact with the sprocket wheels, and means for reciprocating the picker fingers in the bearing blocks and sprocket wheels.

22. In a machine for picking cotton, a series of picker fingers mounted to reciprocate into contact with the cotton plants and to be withdrawn therefrom, a spring for each picker finger normally forcing the same into projected position, a pivoted arm connected to each picker finger, and means for separately engaging the arms to retract the picker finger in opposition to said springs.

23. In a machine for picking cotton, a series of picker fingers mounted to reciprocate into contact with the plants and to be withdrawn therefrom, a spring for each picking finger normally forcing it into projected position, a series of arms one for each finger each connected to a picker finger, a shaft and cams on the shaft adapted to retract the picker fingers in opposition to the pressure of the springs.

24. In a machine for picking cotton, a series of picker fingers mounted to reciprocate into and out of contact with the cotton plants and to permit rearward swinging, means to reciprocate the fingers and means to yieldingly hold them in a position transverse to the direction of movement of the machine.

25. In a machine for picking cotton, a series of picker fingers mounted to reciprocate into and out of contact with the cotton plants and to permit rearward swinging, means to reciprocate the fingers, a series of eye bars through the ends of which the several picker fingers pass and yielding means connected to the eye bars for normally holding the picker fingers transversely of the path of movement of the machine.

26. In a cotton-picking machine, a casing having a series of horizontal slots therein, a series of pivoted bearing blocks mounted in the casing, a series of picker fingers severally mounted in the bearing blocks and extending through the slots in the casing, a series of eye bars through which the picker fingers severally extend, springs connected to the eye bars and normally maintaining the picker fingers in a position transverse to the direction of motion of the machine, means for reciprocating the fingers through said slots and means for continuously rotating the fingers.

27. In a machine for picking cotton, a casing, a vertical series of picker fingers mounted in the casing, a vertical belt arranged within the casing adjacent the series of picker fingers and provided with means for removing cotton from the latter, means for projecting said fingers axially into contact with the plants to be picked and withdrawing them within the casing and means for moving the fingers laterally into close proximity to said belt when said fingers are in retracted position.

28. In a machine for picking cotton, a vertical series of picking fingers, a series of pivoted bearings through which such fingers are arranged to reciprocate, means for reciprocating the fingers, means adjacent the inner position of the picker heads for removing cotton therefrom, a series of eye bars in the ends of which the picker fingers are severally mounted and means for reciprocating said eye bars to vary the distance of the picker fingers from the cotton-removing means.

29. In a machine for picking cotton, a vertical series of picking fingers, a series of pivoted bearings in which the fingers are mounted to reciprocate, means for reciprocating the fingers including a cam shaft, belts provided with card clothing arranged adjacent the picker fingers, a series of eye bars in the ends of which the picker fingers are severally mounted, springs tending to hold the picker fingers in close proximity to the said belts and cams on the cam shaft for engaging the eye bars and swinging the picker fingers away from said belts.

30. In a machine for picking cotton, a casing having a wall extending longitudinally of the machine, a vertical series of horizontal slots in said wall, a vertical series of picker fingers mounted adjacent to and adapted to reciprocate through said slots, a series of pivoted bearing blocks in which the fingers are severally mounted, springs tending to project the fingers through the slots, a series of pivoted arms severally connected to the fingers, a cam shaft, cams on said shaft adapted to engage the arms and retract the fingers against the pressure of their springs, sprocket wheels arranged on the fingers and with reference to which the latter are free to reciprocate, a sprocket chain for rotating said sprockets, a belt provided with cotton-removing means arranged adjacent the series of picker fingers, a series of eye bars through which the picker fingers severally extend, springs connected to said eye bars for holding the picker fingers in close proximity to the belt and cams on the cam shaft for engaging the eye bars for swinging the picker fingers away from said belt.

HARVEY L. FISHER.

Witnesses:
JOHN B. MACAULEY,
ROBERT DOBBERMAN.